US007169321B2

(12) United States Patent
Simmons et al.

(10) Patent No.: US 7,169,321 B2
(45) Date of Patent: *Jan. 30, 2007

(54) BIOBASED DEICING/ANTI-ICING FLUIDS

(75) Inventors: Kevin L. Simmons, Kennewick, WA (US); John G. Frye, Jr., Richland, WA (US); Todd A. Werpy, West Richland, WA (US); William D. Samuels, Richland, WA (US); H. Nicholas Conkle, Columbus, OH (US); Bruce F. Monzyk, Delaware, OH (US); Sara F. Kuczek, Pataskala, OH (US); Satya P. Chauhan, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/374,662

(22) Filed: Feb. 26, 2003

(65) Prior Publication Data
US 2004/0079918 A1 Apr. 29, 2004

Related U.S. Application Data

(60) Provisional application No. 60/434,612, filed on Dec. 18, 2002, provisional application No. 60/421,647, filed on Oct. 28, 2002.

(51) Int. Cl.
*C09K 3/18* (2006.01)
(52) U.S. Cl. .......................... 252/70; 106/13
(58) Field of Classification Search .................. 252/70; 106/13
See application file for complete search history.

(56) References Cited

U.S. PATENT DOCUMENTS

| | | | | |
|---|---|---|---|---|
| 3,838,992 | A | 10/1974 | Rosenwald | 44/72 |
| 4,358,389 | A | 11/1982 | Konig-Lumer et al. | 252/70 |
| 4,388,203 | A | 6/1983 | Nimerick et al. | 252/70 |
| 4,585,571 | A | 4/1986 | Bloom | 252/70 |
| 4,746,449 | A * | 5/1988 | Peel | 252/70 |
| 4,875,929 | A * | 10/1989 | Morgan et al. | 504/347 |
| 4,954,279 | A | 9/1990 | Ma et al. | 252/70 |
| 5,268,117 | A | 12/1993 | Fusiak et al. | 252/70 |
| 5,386,968 | A | 2/1995 | Coffey et al. | 252/70 |
| 5,674,428 | A | 10/1997 | Lott et al. | 252/70 |
| 5,681,882 | A | 10/1997 | Jenkins et al. | 524/388 |
| 5,708,068 | A * | 1/1998 | Carder et al. | 524/375 |
| 5,750,047 | A | 5/1998 | Lemma | 252/70 |
| 5,759,436 | A | 6/1998 | Schrimpf et al. | 252/70 |
| 5,772,912 | A | 6/1998 | Lockyer et al. | 252/70 |
| 5,817,252 | A | 10/1998 | Hu et al. | 252/70 |
| 5,876,621 | A | 3/1999 | Sapienza | 252/70 |
| 5,968,407 | A | 10/1999 | Boluk et al. | 252/70 |
| 5,980,774 | A | 11/1999 | Sapienza | 252/70 |
| 5,993,684 | A | 11/1999 | Back et al. | 252/70 |
| 6,080,331 | A | 6/2000 | Meszaros et al. | 252/79 |
| 6,129,857 | A | 10/2000 | Sapienza | 252/70 |
| 6,149,834 | A | 11/2000 | Gall et al. | 252/70 |
| 6,294,104 | B1 * | 9/2001 | Ilves et al. | 252/70 |
| 6,299,793 | B1 | 10/2001 | Hartley et al. | 252/70 |
| 6,315,919 | B1 | 11/2001 | Sapienza | 252/70 |
| 6,391,224 | B1 | 5/2002 | Wowk | 252/70 |
| 6,436,310 | B1 | 8/2002 | Hartley et al. | 252/70 |
| 6,440,325 | B1 | 8/2002 | Hartley et al. | 252/70 |
| 6,596,189 | B1 * | 7/2003 | Moles et al. | 252/70 |
| 2002/0063236 | A1 | 5/2002 | Sapienza | 252/70 |

FOREIGN PATENT DOCUMENTS

| | | |
|---|---|---|
| CN | 1138080 | 6/1995 |
| CN | 1138080 | 12/1996 |
| EP | 0257720 B1 | 3/1988 |
| EP | 0283231 A1 * | 9/1988 |
| EP | 0555002 A1 | 8/1993 |
| EP | 0646634 B1 | 8/1998 |
| EP | 0860490 A1 | 8/1998 |
| GB | 1272464 | 4/1972 |
| JP | 54-76489 A * | 6/1979 |
| JP | 56-133383 A * | 10/1981 |
| JP | 57167375 A2 | 10/1982 |
| JP | 62201566 A2 | 10/1982 |
| RU | 2142491 | 12/1999 |

(Continued)

OTHER PUBLICATIONS

Fluka AG: "Fluka Chemika-BioChemika" 1993, p. HFL 1096, Polyvinylpyrrolidone, (no month).

*Primary Examiner*—Anthony J. Green
(74) *Attorney, Agent, or Firm*—MacMillan, Sobanski & Todd, LLC

(57) ABSTRACT

A nontoxic deicing/anti-icing fluid includes a biobased freezing point depressant, a surfactant, an antioxidant, and water. The fluid has an $LD_{50}$ greater than about 10,000 mg/L. Another deicing/anti-icing fluid includes a biobased freezing point depressant, a vinylpyrrolidone polymer having a molecular weight between about 10,000 and about 700,000, and water. Another deicing/anti-icing fluid includes a biobased freezing point depressant, a nonionic surfactant selected from the polyoxyalkylene ethers, an antioxidant, and water. Another deicing/anti-icing fluid includes a biobased freezing point depressant, a surfactant, a food grade material that functions as an antioxidant, and water. A further deicing/anti-icing fluid includes a biobased freezing point depressant, a material that functions as both a buffer and a freezing point depressant, and water.

20 Claims, No Drawings

FOREIGN PATENT DOCUMENTS

| | | |
|---|---|---|
| RU | 2186818 | 8/2002 |
| SU | 1101444 | 6/1982 |
| WO | 87/04450 | 7/1987 |
| WO | 91/10361 | 7/1991 |
| WO | 00/00568 A1 | 1/2000 |
| WO | 01/29146 A1 | 4/2001 |
| WO | WO 01/029146 A1 * | 4/2001 |

* cited by examiner

US 7,169,321 B2

BIOBASED DEICING/ANTI-ICING FLUIDS

CROSS-REFERENCE TO RELATED APPLICATIONS

This application claims the benefit of U.S. provisional application Ser. No. 60/421,647 filed on Oct. 28, 2002, and U.S. provisional application Ser. No. 60/434,612, filed Dec. 18, 2002.

BACKGROUND OF THE INVENTION

This invention relates in general to compositions to remove ice from surfaces and/or to prevent ice from forming on surfaces, and in particular to biobased deicing/anti-icing fluids.

De-icing/anti-icing fluids are used in many different applications, such as on roadways, sidewalks, airport runways, and other outdoor surfaces where icing is a problem. In one particular application, deicing/anti-icing fluids are used in the aircraft industry to control icing on the surfaces of planes or runways. Deicing involves the application of a deicing fluid onto ice that has already formed on the plane or runway in order to remove the ice. The deicing fluid lowers the freezing point of the ice so that it becomes a liquid rather than a solid. Anti-icing involves the application of an anti-icing fluid onto a surface of the plane or runway before ice is present, thereby lowering the freezing point of any precipitation that contacts the surface and preventing it from turning into ice.

Fluids based on propylene glycol and ethylene glycol are the most popular aircraft deicing/anti-icing fluids in use today. The glycol-based fluids are effective against ice, but they are considered to be harmful to the environment, particularly if applied in large volumes. There is a strong need for environmentally friendly deicing/anti-icing fluids that perform comparably to the glycol-based fluids.

Several patents disclose aircraft deicing/anti-icing fluids containing sorbitol and/or glycerol instead of propylene glycol or ethylene glycol. For example, U.S. Pat. No. 6,129,857 to Sapienza discloses aircraft deicing/anti-icing fluids containing sorbitol, water and other ingredients. U.S. Pat. No. 5,993,684 to Back et al. discloses aircraft deicing fluids containing glycerol, sorbitol and water, and optionally materials such as thickeners, antioxidants, pH adjusters, stabilizers, biocides, or corrosion inhibitors. International Patent Publication No. WO 01/29146 A1 to Westmark et al. discloses aircraft deicing fluids containing glycerol, non-ionic surfactant, polysaccharide thickener, and water. There is still a need for improved deicing/anti-icing fluids.

SUMMARY OF THE INVENTION

This invention relates to a nontoxic deicing/anti-icing fluid including a biobased freezing point depressant, a surfactant, an antioxidant, and water. The fluid has a lethal dose ($LD_{50}$) greater than about 10,000 mg/L.

The invention also relates to a deicing/anti-icing fluid including a biobased freezing point depressant, a vinylpyrrolidone polymer having a molecular weight between about 10,000 and about 700,000, and water.

The invention also relates to a deicing/anti-icing fluid including a biobased freezing point depressant, a nonionic surfactant selected from the polyoxyalkylene ethers, an antioxidant, and water.

The invention also relates to a deicing/anti-icing fluid including a biobased freezing point depressant, a surfactant, a food grade material that functions as an antioxidant, and water.

The invention also relates to a deicing/anti-icing fluid including a biobased freezing point depressant, a material that functions as both a buffer and a freezing point depressant, and water.

The invention further relates to a concentrated deicing/anti-icing fluid including a biobased freezing point depressant, a vinylpyrrolidone polymer having a molecular weight between about 10,000 and about 700,000, and from about 5% to about 20% by weight of water.

Various advantages of this invention will become apparent to those skilled in the art from the following detailed description of the preferred embodiments.

DETAILED DESCRIPTION OF THE PREFERRED EMBODIMENTS

In one embodiment, the invention relates to a nontoxic deicing/anti-icing fluid including a biobased freezing point depressant, a surfactant, an antioxidant, and water. It has been discovered that fluids having desirable performance properties and physical characteristics can be produced using a biobased freezing point depressant in combination with a streamlined low toxicity additive package. The fluids do not require all the additives typically used in such fluids to achieve the desired performance. The deicing/anti-icing fluids usually pass the deicing requirements for commercial and military use. In some embodiments, the fluids meet the requirements of Aerospace Material Specification (AMS) 1424D, "Deicing/Anti-Icing Fluid, Aircraft," published in 2001, or its international equivalent, The International Organization for Standardization, ISO 11075, "Aerospace-Aircraft De-Icing/Anti-Icing Newtonian Fluids ISO Type I", or versions of these specifications that may be updated in the future, and AMS 1435 "Fluid, Generic, Deicing/Anti-Icing Runways are Taxiways", published in August 1999.

The deicing/anti-icing fluids are exponentially less toxic than traditional propylene glycol and ethylene glycol deicers. The fluids have an $LD_{50}$ for fathead minnows greater than about 10,000 mg/L, preferably greater than about 15,000 mg/L, more preferably greater than about 30,000 mg/L, and most preferably greater than about 50,000 mg/L. The aquatic toxicity is determined using a fathead minnow 96-hour $LD_{50}$ as measured according to OECD Methods 202 and 203 or equivalent. The $LD_{50}$ is the highest concentration at which 50% of the fish do not survive the test period.

The biobased freezing point depressant used in the deicing/anti-icing fluids is one or more polyols having 3 to 8 carbon atoms, selected from glycerol, sorbitol, pentaerythritol, diethyl malonate, reduced aldose and ketose sugars having 4 to 7 carbon atoms, or mixtures thereof. The $C_3$ polyol is glycerol. The $C_4$ polyols are erythritol and threitol (all reduced 4 carbon aldose and ketose sugars). The $C_5$ polyols are xylitol, ribitol, arabitol (all reduced 5 carbon aldose and ketose sugars), and pentaerythritol. The $C_6$ polyols are mannitol, iditol, talitol, allitol, galactitol, gluitol, altritol, inositol (all reduced 6 carbon aldose and ketose sugars), and sorbitol. The $C_7$ polyols are perseitol and sedohepitol (all reduced 7 carbon aldose and ketose sugars). The $C_8$ polyol is diethyl malonate. Glycerol is a preferred type of polyol for use in the fluids.

In some embodiments, the fluids include a mixture of the polyols. Preferably, the mixture includes glycerol with no other polyols, or in combination with one or more of the other listed polyols, such as xylitol or sorbitol. The glycerol provides the main freezing point lowering effect, while the other polyol provides a thickening effect that enhances the performance of the composition when used as a fluid.

The polyols can be produced from renewable resources (such as from corn and corn processing byproducts or from many other agricultural sources) and as such are economically and readily available in commercial quantities. It is expected that the polyol-based deicing/anti-icing fluids can be produced more inexpensively than glycol-based deicers.

The amount of polyol used in the fluids is the balance after adding the percentages of surfactant, antioxidant, water, and any optional ingredients. The fluids can contain any suitable amount of polyol. Deicing/anti-icing fluids preferably contain from about 10% to about 95% polyol by weight, and more preferably from about 50% to about 88%. When the fluids contain glycerol in combination with one or more of the other polyols, the fluids preferably contain from about 10% to about 88% glycerol and from about 1% to about 30% other polyol(s).

The deicing/anti-icing fluids can include one or more surfactants. Preferably, the fluids include a nonionic surfactant; anionic, cationic, and amphoteric (zwitterionic) surfactants are less preferred. Some nonlimiting examples of suitable nonionic surfactants are: alkylphenol ethoxylates ($C_{12}$ or lower, $C_8$ or lower preferred); fatty or oxo-alcohol polyethyleneglycol ethers ($C_{16}$ or lower, $C_6$ or lower preferred); ethylene oxide-propylene oxide polymers ($C_{80}$ or lower, $C_2$ or lower preferred); fatty alcohol polyglycol ethers ($C_{18}$ or lower, $C_8$ or lower preferred); polyethoxylates such as polyoxyethylene ethers; polypropyloxylates such as polyoxypropylene ethers; sugar-based surfactants such as alkyl glycosides (e.g., alkyl benzene and tert-butoxyethanol); ethers of $C_1$ to $C_8$ polyethylene oxide repeat units of 2 to 50 polyethylene oxide units (low carbon alkyl group and somewhat higher carbon ethoxylate group preferred); polyvinyl alcohols having MW 1000–10,000; and polyvinyl pyrrolidones.

In a preferred embodiment, the deicing/anti-icing fluids of the invention include a biodegradable freezing point depressant, an antioxidant, and one or more nonionic surfactants selected from the polyoxyalkylene ethers. Some preferred polyoxyalkylene ethers are ethers of $C_{12}$ to $C_{18}$ alcohols with polyethylene oxide repeat units of 2 to 100 polyethylene oxide units. Such surfactants include, for example, the Brij™ series of surfactants manufactured by ICI (e.g., Brij 30, 35, 52, 56, 58, 72, 76, 78, 92, 97, 98 and 700). Brij 35 is polyoxyethylene lauryl ether, 718 average MW, having the chemical formula: $CH_3(CH_2)_{11}(CH_2CH_2O)_xH$, where x on average is 23.

The fluids can contain any suitable amount of surfactant. Preferably, the fluids contain from about 0.01% to about 0.5% surfactant by weight, and more preferably from about 0.05% to about 0.2%.

The deicing/anti-icing fluids can also include one or more antioxidants. Some nonlimiting examples of suitable antioxidants are salts of unsaturated carboxylic acids having 4 to 18 carbon atoms. In a preferred embodiment, the fluids include a biobased freezing point depressant, a surfactant, and a food grade material that functions as an antioxidant. It was not obvious beforehand to use a food grade material in a nonfood application (the deicing/anti-icing fluids). It was also necessary to determine which food grade materials would go into solution and provide the desired antioxidant benefits.

Any suitable food grade material having the desired antioxidant and solubility properties can be used, such as sodium sorbate, potassium sorbate, or an unsaturated triglyceride such as corn oil, cottonseed oil, linseed oil, or tung oil. Tocopherols can also be used; these are natural products that are present in soybean oil and other natural product oils. Potassium sorbate and sodium sorbate provide very effective anti-oxidation protection. If desired, the sodium sorbate can be provided by adding an equal molar mixture of sorbic acid and sodium bicarbonate that reacts to form sodium sorbate. Some food grade materials such as ascorbic acid, citric acid, and BHT were found to be insufficient in their antioxidant effect and/or solubility.

The fluids can contain any suitable amount of antioxidant. Preferably, the fluids contain from about 0.01% to about 1% antioxidant by weight, and more preferably from about 0.05% to about 0.2%.

The deicing/anti-icing fluids can optionally include one or more buffers for pH control. The fluids can have any suitable pH. The pH of the fluids is usually from about 3.5 to about 9, and preferably from about 6 to about 9. Some nonlimiting examples of suitable buffers include: phosphate salts ($K^+$, $NH_4^+$); pyrophosphates ($Na^+$, $K^+$, $NH_4^+$); metaphosphates ($Na^+$, $K^+$, $NH_4^+$); carbonic acid and its salts ($Na^+$, $K^+$, $NH_4^+$); hydroxyl ammonium ($Na^+$, $K^+$, $NH_4^+$); adidic acid and its salts ($Na^+$, $K^+$, $NH_4^+$); maleic acid and its salts ($Na^+$, $K^+$, $NH_4^+$); and ascorbic acid and its salts ($Na^+$, $K^+$, $NH_4^+$).

In one embodiment, the deicing/anti-icing fluids include a biobased freezing point depressant, a material that functions as both a buffer and a freezing point depressant, and water. Preferably, the material also improves the thermal stability of the fluid. Any suitable material having these properties can be used, for example certain of the phosphate salts. A particular example is a mixture of mono-basic sodium phosphate and di-basic sodium phosphate, such as the monohydrate mono-basic and heptahydrate di-basic sodium phosphates.

The fluids can contain any suitable amount of the buffer/freezing point depressant. The fluids preferably contain from about 0.02% to about 2% mono-basic sodium phosphate and from about 0.02% to about 2% di-basic sodium phosphate by weight, more preferably from about 0.3% to about 1.5% mono-basic sodium phosphate and from about 0.3% to about 1.5% di-basic sodium phosphate.

The deicing/anti-icing fluids can optionally include one or more anti-microbial agents. Some nonlimiting examples of suitable anti-microbial agents include: sodium azide; quaternary ammonium compounds (e.g., 2-methyl-4,5-trimethylene-4-isothizoline-3-one; n-alkyl dimethyl benzyl ammonium $X^-$ [where alkyl carbon number is $C_{12\text{-}18}$]; n-alkyl trimethyl ammonium $X^-$ [where alkyl carbon number is $C_{12\text{-}18}$]; dialkyl dimethyl ammonium $X^-$ [where alkyl carbon number is $C_{12\text{-}18}$]; octyl decyl dimethyl ammonium $X^-$ [where $X^-$ is $Cl^-$, $Br^-$, $I_3^-$, $HCO_3^-$, $CO_3^{2-}$, phosphates, phosphonates, OH, carboxylates, polycarboxylates]); $M^+$ benzoates (where $M^+$ is $Na^+$, $K^+$, $NH_4^+$; alkyl dimethyl benzyl ammonium chlorides; and alkyl dimethyl benzyl/ethyl benzyl ammonium chlorides.

The deicing/anti-icing fluids can also optionally include one or more fire inhibitors and/or corrosion inhibitors. Some common additives used for both fire and corrosion inhibition include sodium tolyltriazole and 1 H-benzotriazole, methyl.

In another embodiment of the invention, the deicing/anti-icing fluids include a biobased freezing point depressant as described above, in combination with a vinylpyrrolidone polymer having a molecular weight between about 10,000 and about 700,000, and water. By "vinylpyrrolidone polymer" is meant a homopolymer or a copolymer of vinylpyrrolidone, or a derivative thereof. Suitable derivatives of vinylpyrrolidine polymer may include alkylated polyvinylpyrrolidones, 2-menthyl. Preferably, the vinylpyrrolidone polymer is polyvinylpyrrolidone.

The vinylpyrrolidone polymer has a molecular weight between about 10,000 and about 700,000, and preferably not greater than about 360,000. It is believed that higher molecular weight vinylpyrrolidone polymers may produce deicing/anti-icing fluids having less desirable properties, particularly for aircraft and runway deicing.

The deicing/anti-icing fluids can contain any suitable amount of the vinylpyrrolidone polymer. Typically, the fluids contain about 5% or less vinylpyrrolidone polymer, and usually between about 0.1% and about 3%.

Advantageously, the vinylpyrrolidone polymer often functions as both a thickener and a surfactant in the fluid. Consequently, fluids having desirable properties can be produced using a minimal number of ingredients. However, optionally the fluids can also contain other ingredients such as an antioxidant and/or a second surfactant.

The deicing/anti-icing fluids also include water in any suitable amount, usually in an amount of from about 40% to about 70% by weight. By "water" is meant any suitable type of aqueous solvent. It should be noted that the percentages of ingredients given herein are based on a ready-to-use fluid. The fluid can also be provided in a concentrate formulation, in which case the percentage of water will decrease (e.g., the concentrate may contain from about 5% to about 20% water) and the percentages of other materials will increase accordingly.

In another embodiment, the invention relates to a concentrated deicing/anti-icing fluid including a biobased freezing point depressant, a vinylpyrrolidone polymer having a molecular weight between about 10,000 and about 700,000, and water. The use of the vinylpyrrolidone polymer in the fluid enables an effective, highly concentrated fluid. The vinylpyrrolidone polymer can solubilize with very little water, and thus it can be used in place of ingredients that require a larger amount of water to solubilize, such as sorbitol or xylitol. The concentrated fluid contains from about 5% to about 30% water, and typically from about 10% to about 20%. In some preferred embodiments, the concentrated fluid contains from about 80% to about 88% glycerol, from about 0.5% to about 3% vinylpyrrolidone polymer, and from about 5% to about 20% water. Optionally, the concentrated fluid may contain additional ingredients such as an antioxidant and/or a surfactant.

The deicing/anti-icing fluids can be used in any application requiring deicing and/or anti-icing. In some embodiments, the fluids are used for the removal of, and/or time-limited protection against, deposits of frost, ice, and/or snow on exterior aircraft surfaces prior to take off, or on roadway/runway surfaces. The fluids are usually applied through a commercial deicing/anti-icing vehicle system to the surfaces at pressures and flow rates normal for intended use.

In addition to application to aircraft, the fluids can also be used for other anti-icing/deicing applications. Common applications would include surfaces of, for example, airport pavements, roadways, walkways, sidewalks, bridges, entrances, electrical tower structures and their components, electricity transmission lines, canals, locks, vessels, nautical components, railroad switches, and motor vehicles. In addition, the fluids can be used in applications such as birdbaths, outdoor fountains, decorative ponds, and other outdoor areas where water freezing would be aesthetically or functionally unacceptable. In these applications the fluids can prevent water from freezing during the winter in cold climates with reduced biological risk to wildlife or domestic animals. In some applications, the surfactant Brij-35 is not used because it may cause foaming that is aesthetically undesirable.

Following are some preferred deicing/anti-icing fluids suitable for use in the invention:

| | First Fluid | |
|---|---|---|
| % Range | % Preferred | Chemical |
| 10–80% | 73.3% | Glycerol, 99% |
| 0.01–1.0% | 0.096% | Brij ® 35 |
| 0.01–1.0% | 0.077% | Sorbic acid |
| 0.01–1.0% | 0.058% | NaHCO3 |
| 0.02–2.0% | 0.48% | NaH2PO4.H2O monobasic monohydrate |
| 0.02–2.0% | 0.98% | Na2HPO4.7H2O dibasic heptahydrate |
| 15–70% | 24% | Water |
| 0.05–0.1% | trace | Food coloring |
| 0.01–3.0% | 0.96 | Polyvinylpyrrolidone, molecular weight 360,000 Daltons |

| | Second Fluid | |
|---|---|---|
| % Range | % Preferred | Chemical |
| 10–70% | 60.35% | Glycerol, 99% |
| 1–25% | 6.04% | Xylitol |
| 0.01–1.0% | 0.095% | Brij ® 35 |
| 0.01–1.0% | 0.076% | Sorbic acid |
| 0.01–1.0% | 0.057% | NaHCO3 |
| 0.02–2.0% | 1.17% | NaH2PO4.H2O monobasic monohydrate |
| 0.02–2.0% | 1.18% | Na2HPO4.7H2O dibasic heptahydrate |
| 15–70% | 31% | Water |
| 0.05–0.1% | trace | Food coloring |

| | Third Fluid | |
|---|---|---|
| % Range | % Preferred | Chemical |
| 10–80% | 50% | Glycerol, 99% |
| 2–30% | 10% | Sorbitol, 70% |
| 0.01–1.0% | 0.05% | Brij ® 35 |
| 0.01–1.0% | 0.04% | Sorbic acid |
| 0.01–1.0% | 0.03% | NaHCO3 |
| 0.02–2.0% | 0.02% | NaH2PO4.H2O monobasic monohydrate |
| 0.02–2.0% | 0.02% | Na2HPO4.7H2O dibasic heptahydrate |
| 15–70% | 40% | Water |
| 0.05–0.1% | trace | Food coloring |

The above fluids are very non-toxic. In particular, the third fluid has an $LD_{50}$ (fathead minnow) of 58,000 mg/L. The deicing/anti-icing fluids of the invention are believed to be substantially less toxic than previously known biobased deicers.

The following table lists some different formulations of aircraft deicing fluids (ADF) according to the invention (the amounts shown are weight percentages).

| | | | | | | | | | |
|---|---|---|---|---|---|---|---|---|---|
| glycerol | 66.82 | 62.6 | 59 | 66.73 | 62.63 | 57.85 | 66.66 | 62.37 | 58.87 |
| xylitol | 6.68 | 12.5 | 17.7 | 6.68 | 12.50 | 17.30 | 6.67 | 12.50 | 17.57 |
| water | 22.5 | 21.2 | 19.8 | 25.18 | 23.54 | 23.63 | 24.07 | 22.52 | 20.90 |
| Brij-35 | 0.13 | 0.12 | 0.11 | 0.13 | 0.12 | 0.11 | 0.10 | 0.10 | 0.10 |
| sodium sorbate | 1.29 | 1.21 | 1.13 | 1.29 | 1.21 | 1.11 | 1.01 | 1.00 | 1.00 |
| NaH2PO4 | 1.29 | 1.22 | 1.14 | 0 | 0 | 0 | 1.00 | 1.00 | 1.03 |
| Na2HPO4 | 1.3 | 1.22 | 1.14 | 0 | 0 | 0 | 0.50 | 0.50 | 0.53 |
| polyvinyl-pyrrolidone | 0 | 0 | 0 | 0 | 0 | 0 | 0 | 0 | 0 |
| glycerol | 66.66 | 66.6 | 62.44 | 76.35 | | 80.0 | 88.0 | 84.05 | 88.05 |
| xylitol | 6.67 | 6.67 | 12.48 | 0 | | 0 | | | |
| water | 23.16 | 24 | 22.48 | 20.03 | | 16.1 | 8.52 | 12.70 | 7.24 |
| Brij-35 | 0 | 0.10 | 0.10 | 0.10 | | 0.18 | 0.19 | 0.18 | 0.19 |
| sodium sorbate | 1.02 | 1.08 | 1.00 | 1.00 | | | | | |
| NaH2PO4 | 0.50 | 0.50 | 0.50 | 0.50 | | 0.99 | 1.09 | 1.04 | 1.09 |
| Na2HPO4 | 1.00 | 1.00 | 1.00 | 1.02 | | 0.65 | 0.72 | 0.69 | 0.72 |
| polyvinyl-pyrrolidone | 1.00 | 0 | 0 | 1.00 | | 1.19 | 1.30 | 1.24 | 2.61 |
| sorbic acid | | | | | | 0.88 | 0.10 | 0.09 | 0.10 |

The above-listed formulations can also contain a colorant in any suitable amount, usually equivalent to about 0.01 percent.

The following table lists some different ADF formulations according to the invention (the amounts shown are weight percentages):

| | | | | | | | | | |
|---|---|---|---|---|---|---|---|---|---|
| glycerol | 66.71 | 62.47 | 58.84 | 66.71 | 62.47 | 58.84 | 50.00 | 50.00 | 50.00 |
| sorbitol | 6.66 | 12.50 | 17.65 | 6.66 | 12.50 | 17.65 | 10.00 | 10.00 | 10.00 |
| water | 22.61 | 21.26 | 19.97 | 22.61 | 21.26 | 19.97 | 36.90 | 36.95 | 37.05 |
| Brij-35 | 0.13 | 0.12 | 0.11 | 0.13 | 0.12 | 0.11 | 0.10 | 0.05 | 0.05 |
| NaH2PO4 | 1.30 | 1.22 | 1.14 | 0.00 | 0.00 | 0.00 | 1.00 | 1.00 | 0.50 |
| Na2HPO4 | 1.29 | 1.22 | 1.14 | 0.00 | 0.00 | 0.00 | 1.00 | 1.00 | 0.50 |
| sodium sorbate | 1.29 | 1.22 | 1.14 | 1.29 | 1.22 | 1.14 | 1.00 | 1.00 | 1.00 |
| glycerol | 55.49 | 55.49 | | | | | | | |
| mannitol | 5.54 | 5.54 | | | | | | | |
| water | 35.64 | 37.79 | | | | | | | |
| Brij-35 | 0.11 | 0.11 | | | | | | | |
| NaH2PO4 | 1.08 | 0.00 | | | | | | | |
| Na2HPO4 | 1.07 | 0.00 | | | | | | | |
| sodium sorbate | 1.07 | 1.07 | | | | | | | |
| glycerol | 66.66 | 62.48 | 58.88 | 65.39 | 62.19 | 58.82 | 65.39 | 62.19 | 58.82 |
| xylitol | 6.67 | 12.52 | 17.63 | 6.54 | 13.08 | 19.62 | 6.54 | 13.08 | 19.62 |
| water | 22.51 | 21.09 | 19.82 | 22.70 | 22.70 | 22.70 | 26.66 | 23.32 | 20.15 |
| Brij-35 | 0.13 | 0.12 | 0.12 | 0.13 | 0.13 | 0.13 | 0.13 | 0.13 | 0.13 |
| NaH2PO4 | 1.36 | 1.28 | 1.20 | 1.29 | 1.29 | 1.29 | 0.00 | 0.00 | 0.00 |
| Na2HPO4 | 1.34 | 1.26 | 1.18 | 4.62 | 1.29 | 1.29 | 0.00 | 0.00 | 0.00 |
| sodium sorbate | 1.33 | 1.24 | 1.17 | 1.28 | 1.28 | 1.28 | 1.28 | 1.28 | 1.28 |
| glycerol | 66.79 | 62.49 | 58.86 | 66.79 | 62.49 | 58.86 | | | |
| arabitol | 6.66 | 12.68 | 17.65 | 6.66 | 12.68 | 17.65 | | | |
| water | 22.55 | 21.10 | 19.95 | 25.13 | 23.51 | 22.24 | | | |
| Brij-35 | 0.13 | 0.12 | 0.11 | 0.13 | 0.12 | 0.11 | | | |
| NaH2PO4 | 1.29 | 1.21 | 1.14 | 0.00 | 0.00 | 0.00 | | | |
| Na2HPO4 | 1.29 | 1.21 | 1.14 | 0.00 | 0.00 | 0.00 | | | |
| sodium sorbate | 1.29 | 1.21 | 1.14 | 1.29 | 1.21 | 1.14 | | | |
| glycerol | 66.03 | 61.98 | 58.34 | | | | | | |
| erythritol | 6.64 | 12.38 | 17.52 | | | | | | |
| water | 23.22 | 21.78 | 20.51 | | | | | | |
| Brij-35 | 0.13 | 0.12 | 0.12 | | | | | | |
| NaH2PO4 | 1.33 | 1.25 | 1.18 | | | | | | |
| Na2HPO4 | 1.33 | 1.25 | 1.17 | | | | | | |
| sodium sorbate | 1.33 | 1.24 | 1.17 | | | | | | |

Another embodiment of the invention relates to a deicing/anti-icing fluid that is particularly preferred for use as a runway deicing fluid (RDF). The runway deicing fluid includes glycerol, water, a thickener, a surfactant, and a deicing salt. These ingredients can be used in any suitable amounts. Preferably, the runway deicing fluid includes, by weight, from about 2% to about 50% glycerol, from about 40% to about 60% water, from about 3% to about 15% thickener, from about 0.05% to about 0.15% surfactant, and from about 5% to about 35% deicing salt. Any suitable deicing salt can be used in the invention, including potassium acetate, sodium formate, sodium acetate, urea, sodium chloride, calcium chloride, or mixtures thereof. Any suitable thickener can be used in the invention; in some embodiments, the thickener is selected from xylitol, sorbitol, polyvinylpyrrolidone, or mixtures thereof. Any suitable surfactant can be used in the invention; in some embodiments, the surfactant is a nonionic surfactant selected from the polyoxyalkylene ethers, such as Brij-35.

The following table presents effective road, bridge, or runway deicing fluids.

| | | | | | | | | |
|---|---|---|---|---|---|---|---|---|
| glycerol | 33.31 | 27.51 | 22.83 | 18.79 | 49.65 | 48.23 | 41.27 | 36.65 |
| xylitol | 13.32 | 11.00 | 9.09 | 7.53 | 5.03 | 4.32 | 4.16 | 3.81 |
| water | 39.6 | 44.86 | 48.06 | 49.46 | 43.85 | 46.17 | 53.37 | 58.46 |
| Brij 35 | 0.13 | 0.11 | 0.09 | 0.07 | 0.10 | 0.09 | 0.08 | 0.07 |
| potassium sorbate | | | | | 0.10 | 0.09 | 0.08 | 0.07 |
| sodium carbonate | | | | | 1.27 | 1.10 | 1.03 | 0.94 |
| potassium acetate | 13.62 | 16.52 | 19.93 | 24.16 | | | | |

In accordance with the provisions of the patent statutes, the principle and mode of operation of this invention have been described in its preferred embodiments. However, it must be understood that this invention may be practiced otherwise than as specifically described without departing from its spirit or scope.

What is claimed is:

1. A nontoxic deicing/anti-icing fluid comprising: at least about 10% by weight of a freezing point depressant comprising at least one polyol having 3 to 8 carbon atoms;
   a surfactant;
   an antioxidant; and
   at least about 5% by weight of water;
   the fluid having an $LD_{50}$ greater than about 10,000 mg/L.

2. A fluid according to claim 1 having an $LD_{50}$ greater than about 30,000 mg/L.

3. A fluid according to claim 2 having an $LD_{50}$ greater than about 50,000 mg/L.

4. A fluid according to claim 1 wherein the freezing point depressant is a mixture of glycerol and a second polyol, the glycerol providing a majority of a freezing point lowering effect, and the second polyol providing a thickening effect.

5. A fluid according to claim 1 further comprising a buffer.

6. A fluid according to claim 1 comprising at least about 32% by weight of the freezing point depressant.

7. A fluid according to claim 1 comprising at least about 50% by weight of the freezing point depressant.

8. A fluid according to claim 1 wherein the antioxidant excludes citric acid.

9. A deicing/anti-icing fluid comprising:
   a freezing point depressant comprising at least one polyol having 3 to 8 carbon atoms;
   a vinylpyrrolidone polymer having a molecular weight between about 10,000 and about 700,000; and
   water.
   the fluid meeting the requirements of Aerospace Material Specification 1424D for a Type I aircraft deicing/anti-icing fluid.

10. A fluid according to claim 9 wherein the vinylpyrrolidone polymer functions as both a thickener and a surfactant in the fluid.

11. A fluid according to claim 9 wherein the vinylpyrrolidone polymer comprises polyvinylpyrrolidone.

12. A fluid according to claim 9 wherein the vinylpyrrolidone polymer has a molecular weight not greater than about 360,000.

13. A fluid according to claim 9 further comprising a surfactant.

14. A fluid according to claim 9 further comprising an anti-oxidant.

15. A fluid according to claim 9 further comprising a buffer.

16. A deicing/anti-icing fluid comprising:
   at least about 10% by weight of a freezing point depressant comprising at least one polyol having 3 to 8 carbon atoms;
   a nonionic surfactant selected from the polyoxyalkylene ethers;
   an antioxidant excluding citric acid; and
   at least about 5% by weight of water.

17. A deicing/anti-icing fluid comprising:
   at least about 10% by weight of a freezing point depressant comprising at least one polyol having 3 to 8 carbon atoms;
   a surfactant;
   a food grade material that functions as an antioxidant, excluding citric acid; and
   at least about 5% by weight of water.

18. A concentrated deicing/anti-icing fluid comprising:
   a freezing point depressant comprising at least one polyol having 3 to 8 carbon atoms;
   a vinylpyrrolidone polymer having a molecular weight between about 10,000 and about 700,000; and
   from about 5% to about 20% by weight of water;
   the fluid meeting the requirements of Aerospace Material Specification 1424D for a Type I aircraft deicing/anti-icing fluid.

19. A runway deicing fluid comprising:
   glycerol;
   a deicing salt;
   a thickener selected from the group consisting of xylitol, sorbitol, polyvinylpyrrolidone, and mixtures thereof;
   a surfactant; and
   water;
   the fluid meeting the requirements of Aerospace Material Specification 1435 for a runway and taxiway deicing/anti-icing fluid.

20. A runway deicing fluid comprising:
   from about 2% to about 50% glycerol;
   from about 5% to about 35% deicing salt;
   from about 3% to about 15% thickener;
   from about 0.05% to about 0.15% surfactant; and
   from about 40% to about 60% water.

* * * * *